UNITED STATES PATENT OFFICE.

THADDEUS SELLECK, OF GREENWICH, CONNECTICUT.

IMPROVEMENT IN TRACTION FOR LOCOMOTIVE-ENGINES.

Specification forming part of Letters Patent No. 36,486, dated September 16, 1862.

*To all whom it may concern:*

Be it known that I, THADDEUS SELLECK, of Greenwich, in the county of Fairfield and State of Connecticut, have invented or discovered and applied to use a certain new and useful Traction for Locomotive-Engines; and I do hereby declare that the following is a full, clear, and exact description of my said invention.

In starting trains on railways it is usual to employ sand when the wheels slip on the track. This causes abrasion to both the wheels and the tracks, and does not effect the desired object, because the wheels still slip, but not so much; and in locomotive-engines that have run for any length of time, flat or nearly flat places are often worn on the wheels at the point of contact with the track where the pitman has the greatest leverage, and hence causes the wheels to slip, and this wear constantly increases until the wheel is rendered useless. In reversing an engine, the wheels of the same often slide around on the track in the contrary direction without exerting much power to stop the propulsion.

The nature of my invention consists in the employment of finely-crushed Franklinite pig metal on the driving-wheels of a locomotive-engine, or on the track, or both, as a means for causing adhesion or traction. The said Franklinite pig metal is of a very hard and brittle nature, and can be reduced by crushing or pounding into small grains. This is most easily accomplished by operating on the metal that has been melted and poured into water. A small quantity of this granulated metal spread along upon the track, particularly on ascending grades or at stopping or starting places, produces the required traction of the drivers on the track. It appears that said metal is embedded in the tire of the driving-wheels and in the track by the action of the weight; hence it is impossible to make the wheels slip without either crushing the particles of the said metal or the said particles actually abrading the track, and to a considerable extent; hence the traction of the wheels will be as complete and perfect as possible. I have found that when the said crushed Franklinite is spread along upon the track a sufficient distance to come in contact with the entire periphery of the drivers that the said wheels become roughened to such an extent as to be operative for a considerable distance, in consequence of the fine grains remaining embedded in the metal of tire, and if applied to flat places in the driving-wheels, slipping and further wear are prevented at these points. The grains of crushed Franklinite pig metal should be about a thirty-second of an inch in size, although I am not limited in this particular.

What I claim, and desire to secure by Letters Patent, is—

The employment of granulated Franklinite metal as a means for producing traction or adhesion of locomotive-engine wheels on the track, as set forth.

In witness whereof I have hereunto set my signature this 5th day of February, 1862.

THADDEUS SELLECK.

Witnesses:
LEMUEL W. SERRELL,
THOS. GEO. HAROLD.